United States Patent [19]

Harris et al.

[11] 4,383,302
[45] May 10, 1983

[54] MICROCOMPUTER DEVICE HAVING SIMULTANEOUS INPUT AND OUTPUT FUNCTIONS

[75] Inventors: Charles W. Harris, Chesterfield; Charles A. Gregory, Richmond, both of Va.

[73] Assignee: Power Systems & Controls, Inc., Richmond, Va.

[21] Appl. No.: 947,694

[22] Filed: Oct. 2, 1978

[51] Int. Cl.³ .............................................. G01P 3/36
[52] U.S. Cl. .................................. 364/565; 364/438; 324/160
[58] Field of Search ............... 364/565, 438, 705, 709, 364/712; 324/160, 166, 172, 178; 340/38 R, 762; 235/92 TC; 346/18, 33 R, 33 D

[56] References Cited

U.S. PATENT DOCUMENTS

| | | | |
|---|---|---|---|
| 3,182,331 | 5/1965 | Marshall | 346/33 D |
| 3,492,570 | 1/1970 | Tanzman | 364/565 |
| 3,530,382 | 9/1970 | Liston et al. | 364/438 |
| 3,953,720 | 4/1976 | Kelch | 235/92 TC |
| 3,990,070 | 11/1976 | Spence | 340/762 |
| 4,021,656 | 5/1977 | Caudel et al. | 364/709 |
| 4,031,510 | 6/1977 | King | 340/38 R |
| 4,135,155 | 1/1979 | Kehl et al. | 324/178 |
| 4,167,040 | 9/1979 | Heritier et al. | 235/92 TC |
| 4,197,585 | 4/1980 | Moorey et al. | 364/565 |
| 4,205,516 | 6/1980 | Terao | 364/705 |

Primary Examiner—Gary Chin
Attorney, Agent, or Firm—Brooks, Haidt, Haffner, Delahunty

[57] ABSTRACT

A microcomputer for installation in one vehicle for computing and displaying the average speed of another vehicle in which display and data input are actuated simultaneously to minimize peripheral connections and in which provision is made for measureent of speed in real time.

1 Claim, 3 Drawing Figures

MICROCOMPUTER DEVICE HAVING SIMULTANEOUS INPUT AND OUTPUT FUNCTIONS

This invention relates to vehicular speed measurement and in particular provides devices and methods for computing and indicating the average speed of a vehicle in which the computer device itself is located in a second vehicle or elsewhere. Such devices are used, for example, by law enforcement officers, to provide quick and accurate check of the speed of a moving vehicle which may be in violation of the speed laws.

As is shown in Marshall U.S. Pat. No. 3,182,331, it is feasible to construct a device which can conveniently be installed beneath the instrument panel of, for example, a police car, such that the device can be manually operated by the officer driving the car without the necessity of taking his eyes off the road or the speeding vehicle. Such a device basically includes manually operated controls for separately measuring elapsed time and elapsed distance and a computing device for dividing distance by time and displaying the result.

It will be apparent that the police officer or other person desiring to measure the speed of another vehicle having such other vehicle in view and following the same course can start the measurement of time, as the vehicle being checked passes some mark, such as a telephone pole, and turn the measurement of time off as the vehicle passes some other checkpoint. Similarly, the police officer can cause measurement of the elapsed distance in his own vehicle between the same two checkpoints. The odometer cable of the police officer's vehicle is connected directly to the device so that the measurement of distance is actual. The quotient of this distance divided by the time is then computed and displayed.

The Marshall apparatus for carring out these functions is basically mechanical. More recently, electronic apparatus for performing the same functions has been described in Liston, Oliver & Gee U.S. Pat. No. 3,530,382.

It is an important object of the present invention to simplify the construction of such speed measurement devices. To this end, in accordance with this invention, a vehicular average speed measurement device has been implemented in a microcomputer system.

In another aspect, it is also an object of this invention to provide a microcomputer which is capable of reading data, such as pulses generaed by odometer drive cable, while simultaneously reading manually determined data in the form of instructions to the microcomputer and of displaying output data utilizing a minimun number of input and output data lines thereby to simplify the construction of the microcomputer.

These and other objects of the invention are essentially obtained utilizing a microcomputer having a microprocessor without output address lines connected to the microprocessor which lead to a read-only memory (ROM) containing a program, a random access memory (RAM) performing computations, and input and output ports for connection to the peripherals. A two-way data bus interconnects the microprocessor and the ROM, the RAM and the I/O ports such that the microprocessor can selectively address and have data access to memories and ports. An electrical signal generated by the odometer of the vehicle in which the computer is installed is utilized as one data input to the input port. Control devices are also connected to the input port data lines for permitting insertion of coded information from a plurality of separately operable control devices, such as thumbwheel switches. The data input lines are also connected to control devices in the form of switches turning the measurement of distance on and off (record time), for turning the measurement of distance on and off (record distance), for recalling time and for recalling distance. A plurality of display devices, such as 7-segment LEDs are also arranged to be actuated through connection to the output port data lines. Other output data lines are utilized through decoding devices to actuate, separately, the various display devices and simultaneously to actuate, seaprtely, the various input control devices, such that the number of output data lines can be held to a minimum.

The program stored in ROM is designed to respond to the actuation of the record time switch and the record distance switch in a reiterative loop which steps through a sequence of instructions actuating the plurality of display devices and the plurality of manually operable control devices. As the program steps through the reiterative loop, each time the presence of a signal or lack of a signal on the input data line from the odometer head is sensed. If a signal is present and if the record distance switch is closed, a count is made in RAM. The length of the program is such that whether or not a count is made on each iteration when the total number of iterations has been completed to complete the display, before returning to the beginning of the display, a count is made in RAM for time if the record time switch is closed. The total program loop is fixed in length and hence fixed in time such that under the operation of a crystal controlled clock, the count of time which has been stored in RAM is real time. When both the record time and record distance switches have been opened and closed, the program then causes the microprocessor to divide distance by time and displays the result.

For a more complete understanding of the practical application of this invention, reference is made to the appended drawings in which.

Figure 1:
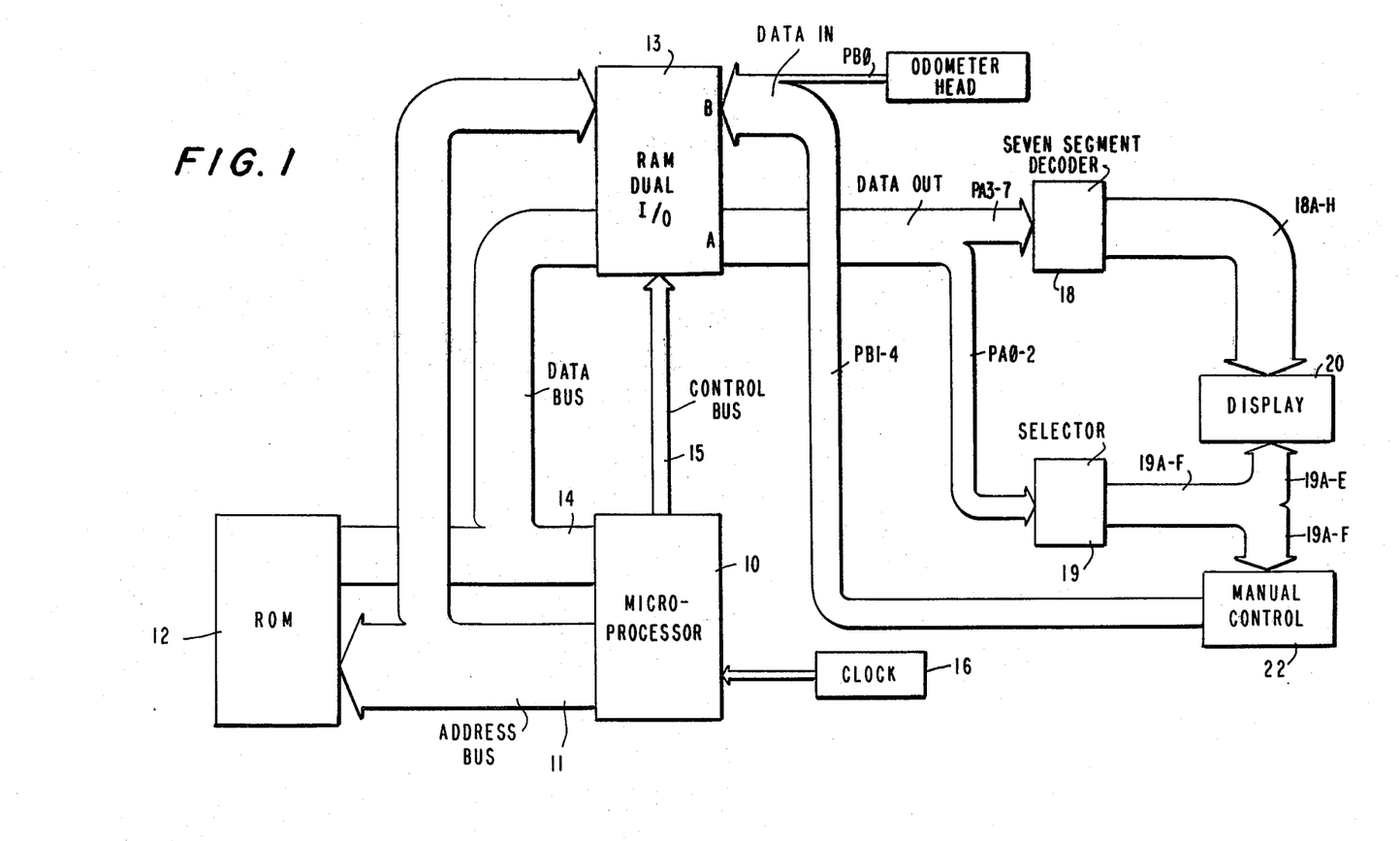
FIG. 1 is a diagrammatic representation of a microcomputer for carrying out this invention.

A microcomputer in accordance with this invention is diagrammatically shown in FIG. 1. The cental unit is a microprocessor chip 10 which has an address bus 11 leading to a read-only chip (ROM) 12 and a third chip 13 which contains both random access memory (RAM) and two I/O ports. Microprocessor 10 is an MCS 6503 which has twelve address lines and eight data lines. The data lines are connected to a two-way data bus 14 which leads to ROM 12 and to chip 13.

Chip 12 is a 2K×8 ROM to which all twelve address lines are connected. Eleven of the address lines, A$\emptyset$ to A10, are connected as address lines to chip 12. The twelve address line A11 is a chip select for ROM 12 when address line A11 is high.

Chip 13 is an MCS 6532 which has a 128×8 RAM, two I/O ports, Port A and Port B, and an interval timer (unused in the described system). Address lines A$\emptyset$ through A6 are connected as address lines to chip 13. Address line A7 is connected to the ram select pin (RS) on chip 13, and address line A11 is connected to the second chip select pin ($\overline{CS2}$) of chip 13, selecting chip 13 when A11 is low. The first chip select pin (CS1) is pulled high to Vcc.

A control bus 15 also interconnects microprocessor 10 and chip 13. The interrupt pins ($\overline{IRQ}$) of microprocessor 10 and chip 13 are tied together in the control bus and pulled high to Vcc. The reset pins ($\overline{RES}$) of microprocessor 10 and chip 13 are also tied together in the control bus and are also pulled high to Vcc. Finally, the control bus 15 includes a connection between he read/write pins (R/W) of the two chips. Microprocessor 10 also has an interrupt pin ($\overline{NMI}$) which is also pulled high to Vcc.

Microprocessor 10 is provided with a clock 16 in in the form of a series mode oscillator controlled by a 1.00000 MHZ crystal, which provides a $\Phi 2$ timing signal for chip 13, as well as clocking microprocessor 10.

As indicated above, all eight data lines $D\emptyset$ through D7 are connected from microprocessor 10 both to ROM 12 and chip 13 for two-way communication between ROM 12 and microprocessor 10 and between chip 13 and microprocessor 10.

Chip 13, as well as having a 128 $\times$ 8 RAM has two I/O ports, A and B. These ports each have an eight bit register which will latch in each direction of data flow. In addition, chip 13 has a data direction register associated with each port.

The RAM address, disregarding the connections of address lines A7 and A11 is 000 to 07F with the stack pointer of microprocessor 10 initially at 07F. The port A address is 080, and the data direction register for port A has an address of 081. The port B address 082, and the data direction register for port B has an address of 083. As indicated above, address line A11 when high actuates ROM 12. ROM 12, itself, is programmed from address 800 to FFF.

Chip 13 is selected when address line A11 is low, and whether a port is addressed or the RAM is addressed is determined by address line A7. Each port in chip 13 has eight data lines $PA\emptyset$ to PA7 and $PB\emptyset$ to PB7. The program in ROM 12 selects port A as an output port and selects port B as an input port.

One input data line $PB\emptyset$ inputs data regarding the distance travelled by the vehicle in which microcomputer is installed. Conveniently, as is described, for example, in Liston, Oliver & Gee U.S. Pat. No. 3,530,382, the odometer head of the vehicle is modified by installing a disk which has six open segments in it equally spaced about the disk. A light source is placed on one side of the disk offset from its center and a photocell or other photosensitive device capable of generating an electrical signal in response to the presence of light is installed on the opposite side of the disk adjacent to the light source.

In most conventional automobiles, the odometer cable makes 1,000 revolutions per mile. Consequently, in travelling one mile, the disk rotating between the light source and photocell produces an electrical signal having 6,000 pulses/mile. Hence, each pulse corresponds to a distance travelled by the vehicle of 0.88 feet. This signal before connection to input port B is sharpened and shortened by passage through a dual Schmidt trigger, and then, as indicated before, is connected to input data line $PB\emptyset$.

Four other input data lines PB1, PB2, PB3 and PB4 are connected to the manual controls for the microcomputer. The remaining three input data lines are not utilized. Five of the data output lines PA3-PA7 are connected to seven segment decoder 18 and three, $PA\emptyset$ to PA2 are connected to a decade decoder 19.

Figure 2:
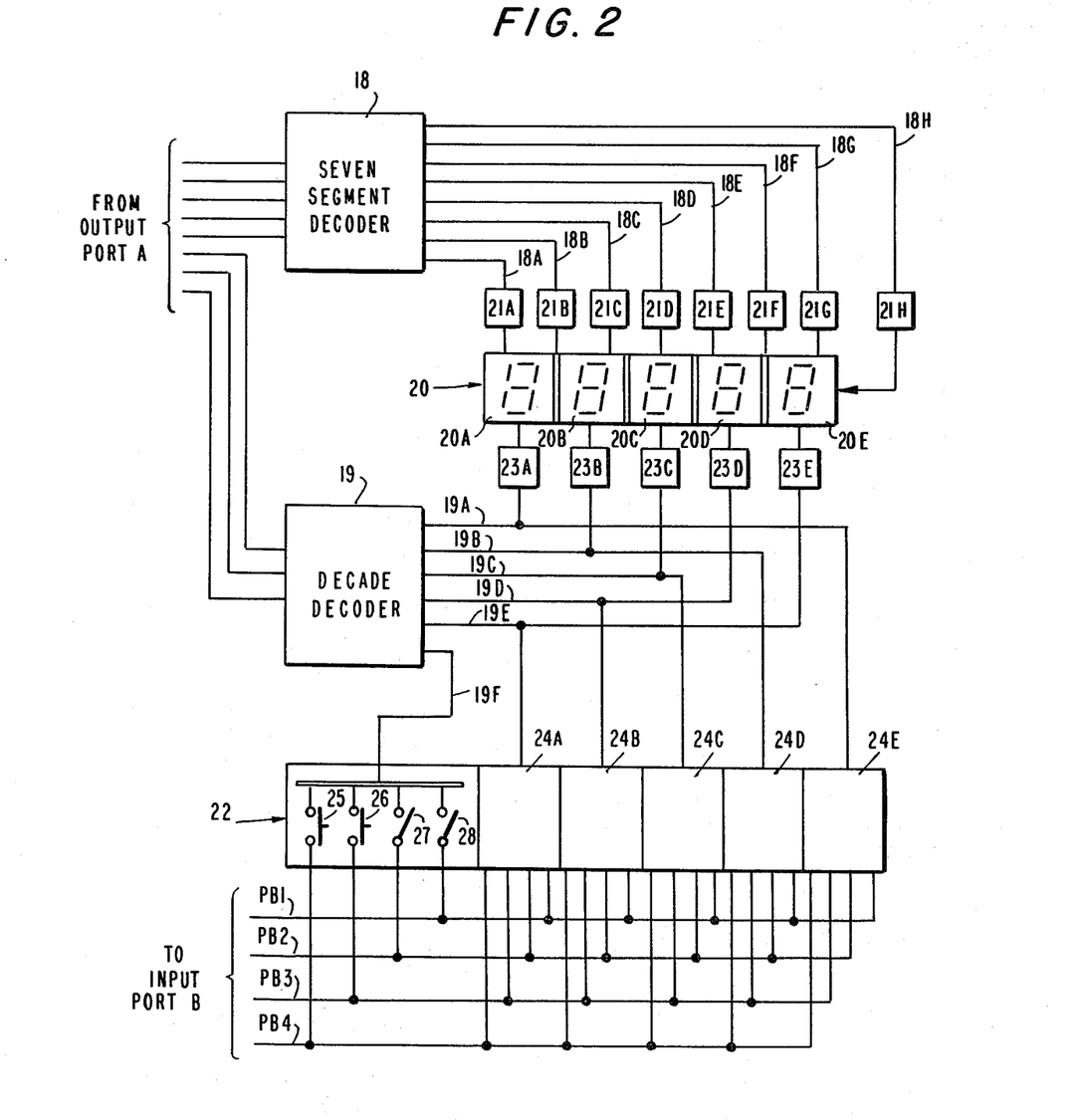
FIG. 2 is a schematic diagram of a portion of the circuitry shown in FIG. 1.

Referring also to FIG. 2, the microcomputer is provided with a display 20 in the form of five seven segment LED digits 20A-20E. The seven segment decoder 18 in a conventional manner has eight output lines 18A-18H, which lead through display segment drivers 21A-21H to display 20. Each display driver 21A-21G corresponds to one segment and the eighth driver 21H sets the decimal point. The five display devices 20A-20E are selectively actuated, at a time in sequence, by selector 19, which as indicated above is a decade decoder. Only six of the output lines 19A-19F of the decoder are required. The first five are connected to display unit drivers 23A-23E which actuate each seven segment LED 20A-20E, respectively, as determined by the signals from segment drivers 21A-21H.

The manual control device 22 consists of five thumbwheel switches 24A-24E which output binary coded decimal and a sixth control group consisting of four control switches 25, 26, 27 and 28. The five thumbwheel switches 24A-24E are driven by the same lines 19A-19E as the display drivers 23A-23E, while the sixth output line 19F of selector 19 is utilized to activate the four control switches 25-28.

Thumbwheel switches 24A-24E are physically disposed to represent the most significant through the least significant digits of a five digit decimal number. Each thumbwheel switch is manually rotatable to select a digit between $\emptyset$ and 9 and outputs a true binary-coded decimal signal representative of such digit on four output lines which are connected, one each to an input data line PB1, PB2, PB3 and PB4, respectively. When, for example, thumbwheel switch 24A is dialed to the number 6, its output, when energized by line 19E presents a signal 0110 to data lines PB1-PB4 respectively. The input data lines PB1-PB4 are normally low. When energized by one of the thumbwheel switches, lines PB1-PB4 input a binary signal to port B representative of the decimal number to which the associated switch is set.

Switch 25 and switch 26 are momentary switches which when closed and actuated by line 19F input a true condition on lines PB4 and PB3, respectively. Switch 25 is the distance recall switch and switch 26 is the time recall switch. Switches 27 and 28 are single pole, single throw switches which are normally open and are connected, respectively, to input a true condition on input data lines PB2 and PB1 when closed. Switch 27 is the record distance switch, and switch 28 is the record time switch.

Figure 3:
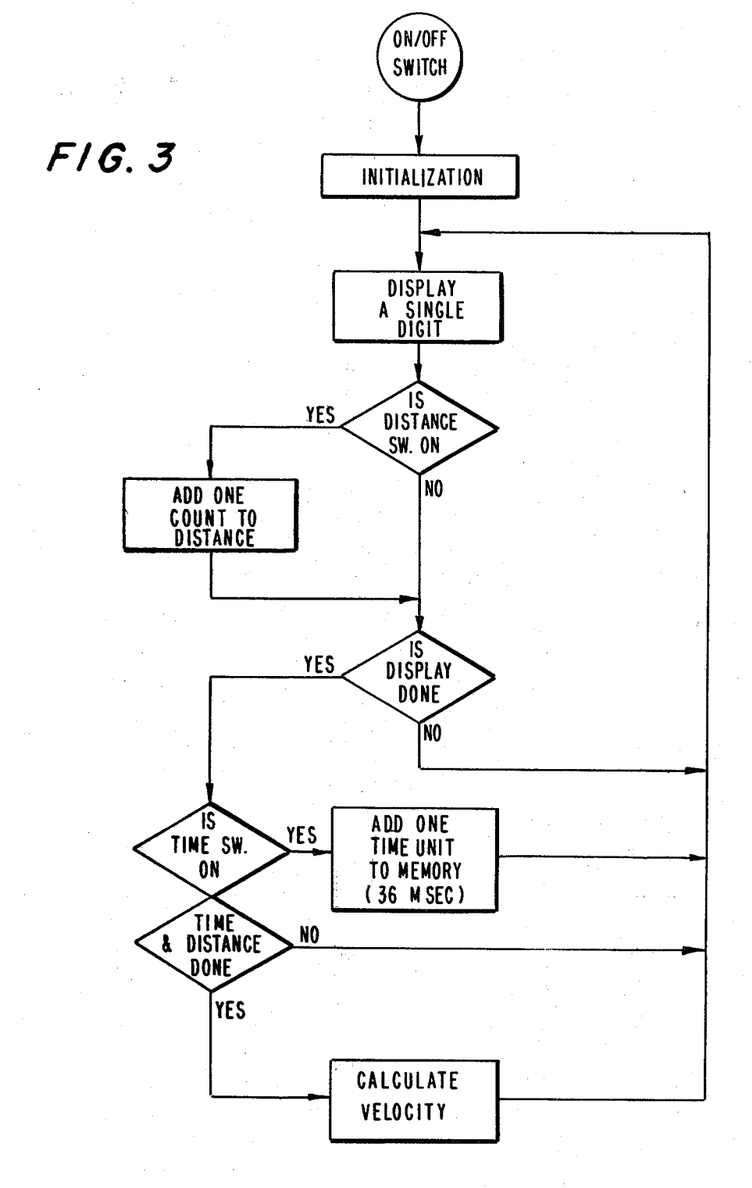
FIG. 3 is a flow diagram of the fundamental program.

FIG. 3 illustrates the flow through the program as utilized to record elapsed time and elapsed distance under the control of switches 27 and 28. When the microcomputer is energized by turning on power, it proceeds through an initialization program and then commences to actuate display 20, sequentially energizing the various LED digits 20A through 20E one at a time. In the first iteration of the display group, one of the digits, for example 23A, is activated. Thereafter, an inquiry is made by activating line 19F and reading input data line PB2 as to whether distance switch 27 is found to be closed, then input data line PB0 is checked to see if there is a count from the odometer. If there is, the count is stored in RAM.

If switch 27 was not closed at the inquiry, a sufficient number of non-operative steps (NOP) are performed by the microprocessor to equal the number of steps required to add the distance count. Thereafter, whether distance was counted or not, the program then inquires whether the display has been completed. Obviously, this requires five iterations. After the first iteration, the program returns to display the second digit and goes through the process of checking distance again, until five iterations of the loop have been completed.

After five iterations, the program then inquires whether the time switch is on by activating line 19F and reading data input PB1. If the time switch is on, the program counts one unit of time and stores this in RAM. The program then returns to reiterate the display. The total time for the larger loop beginning with display of a single digit through the end of the display and counting a unit of time requires 36 milliseconds. Consequently, the counting of time is real time.

When the answer regarding the time switch is that the switch is off, the program then inqures whether both the time switch and distance switch are finished. If the answer is no, the program returns to reiterate the display. If the answer as to whether the time switch and distance switch are finished is yes, the microprocessor then is programmed to retrieve the total count of distance and the total count of time from RAM and to divide the former by the latter incorporating factors to correct the quotient such that it reads in miles per hour or kilometers per hour as required. This information is then put out on output port lines PA3–PA7 such that on the next iteration through the display loop, the quotient indicating the speed of the tracked vehicle is read out.

From the foregoing, it will be apparent that the average speed of another vehicle can be determined and displayed, as suggested in Marshall U.S. Pat. No. 3,182,331, first, closing record time switch 28 as the checked vehicle passes a first checkpoint, then closing record distance switch 27 as the checking vehicle passes the same checkpoint. Thereafter, record time switch 28 is opened as the checked vehicle passes a second checkpoint, and finally record distance switch 27 is opened as the checking vehicle passes the same second checkpoint. Display 22 will then automatically read-out the average speed of the checked vehicle.

However, it is equally feasible for the checking vehicle to pass two checkpoints which can be viewed from a common point to clock the mileage between the checkpoints utilizing record distance switch 27. Thereafter, the checking vehicle can establish itself at the common viewpoint and simply time checked vehicles as they pass the two checkpoints with record time switch 28. The microcomputer automatically displays the average speed at the opening of switch 28.

The program for the microcomputer is, moreover, set up so that if a distance is known, it can be dialed on switches 24A–25E by dialing a 9 for the most significant digit and thereafter the mileage between the two points as a four decimal figure up to 0.9999. In this event, distance recall switch 25 is then pressed and the 9 in the most significant digit is then manually dialed to zero. Thereafter, vehicles crossing the two visible checkpoints simply are checked by measuring time and automatically the microcomputer reads out speed.

It is also a fact of life that, as a vehicle travels and tires wear, odometer readings become inaccurate. The program for the microcomputer described above is set up to provide calibration. To do so, the vehicle must be driven over a known distance, for example, a measured mile along a highway. Before doing this, all zeros are dialed in on the thumbwheel switches 24A–24E. Power is then turned on. Thereafter, the known distance is dialed in on the thumbwheel switches 24A–24E assuming the decimal point to be immediately after switch 24A. The vehicle having the microcomputer then is taken over the course involving the known distance and utilizing the record distance switch 27, the elapsed distance is placed in the microcomputer. The display at that point with the recall distance swich 25 being activated displays the number of pulses per mile (nominally the vehicle should be recording 6,000 pulses per mile). This number or if the readout differs the number on the readout should be dialed in on the thumbwheel switches in order to calibrate the distance measurement thereafter. While the computer is on, the calibration then stays in RAM and the thumbwheel switches can be changed for other purposes such as distance recall.

The object code for the program is set forth below. In the dump, the address in ROM of 800+ is preceded by 182 and both horizontal and vertical checksums are utilized.

```
:10000000A000A200982901F02BB534290F0A0A0A92

:10001000E8C8C433D0020980853198053180000D4D

:10002000EAEAEAEAEAEAA96F851920F42FC006D0C5

:10003000D34C3C28B53429F04A4C1128C617F0039C

:100040004C002818F8A53469118534853585366EC65

:1000500033D8A534C910F0034C0028A90085338596

:100060003485358536480C0028EAEAEAEAEAEAEAA23

:10007000EAEAEAEAEAEAEAEAEAEAEAEAEAEAEAEAE0

:10008000EAEAEAEAEAEAEAEAEAEAEA013806845741F1

:10009000F99C80102475664630342E1C4602640498
```

:1000A0007A1197GEF634ECE5105AB8916646E7647B

:1000B00038517B34A66F2C231ABB1C984A2C7F75B1

:1000C000189C1ADAE347EE81B219BD186540206723

:1000D000A8F81830E44264E39002189C4363A567D3

:1000E000DE999C088546C26611AC1C5A7247F740DF

:1000F0003C1A9A1033222F09123A38B38F67DF4126

:10010000AFFEE7A02D9C3894E9ADE3717A6C3C0A10

:1001100047C8E78D8A9AAE1966A2C467B8919889A4

:100120004866664F88B9130C2B6042C58A9899B40B

:10013000C4CFC6678812889A4BAC6DE720990194AA

:10014000E1C7AB0B81ACD05EE243C266D8D4BEB08F

:10015000E7E6E7E1A237B44861E7C763FA9E04EB3C

:10016000E1C2E3E2FC8A10BF60808641ACACD8A03B

:10017000E46467E73E118C906BE6EF223481809C4B

:10018000DA18FD14E7EFF7E389C9F1D77E7EF6D6E

:100190001C1CF4996746E7F7181CFF284677F64DB4

:1001A000DD1DFE7CF7D76715FE39939B133F65D79E

:1001B00019B8105FEFE1663F181934B9FFB765BF92

:1001C00018285E38FF7375457899BCB8650666F7E0

:1001D0001C5E1D90F5C707FF3DD030DE754972C02B

:1001E0009D1EDA3E4FE7DF57BF7CFAFA4F727771F8

:1001F0001A533F1F57AE6F378D1E94DEEFF76353D0

:10020000E7DB43DFBAB6FA785CDEE6675C7C907EBB

:100210007F767ECA19D810D9D4F7F6475A697DB8C7

:10022000CF7F07663CD0D5FCE6EFFF3ED8E8FEB8AE

:1002300044B72F673CFB98AC6C4B7EAFBF9ED4D8C5

:10024000DE3EF5F115F2B0AD7EEEF66E5EF0FC230B

:100250003EFFFED21B1CB09E5F9FDC67F85CD8E9B6

:1002600076DFC6EF3E59FFF567FF664F15BAD2DC61

:10027000447F7816DDD034764A3DE5E798B7381BE1

:100280009C1098A62CB46EB9913006923674AA327

:100290000290A2001A2E262660089100903912362D3

:1002A00019CA8D594F870041 13B25108A7660587B7

:1002B000D8BC91D905E58FE709B98109536B7767F8

:1002C0008900591 2C763304301 2CE1888709036212

:1002D00029110000 6B45662B928000 88636C022216

:1002E0001184 1C586F8B8F7710E2318807045B22D2

:1002F0005D79820003D7E4872A94911D412BFF6F1B

:100300006 1EAF66F3D941838EEEECD46F4B20890EF

:100310006F40FD675804585E57806F32D994B00C17

:10032000467D336E99147C8044CA86E7B6B05CCCB7

:1003300037762C47E818EB0005FC2F6768B486D0A9

:10034000C5224666 18183C4C4075C54B7050BD849C

:1003500063577E1408E8C8A0C7EF7F660C98F4DCEA

:100360000267EE56EF82C1C154266BF561400428AA

:1003700004744FE571C54B8706547ED46485FF496F5

:10038000BE109A8023D6CB17B8F190B8376ECF172E

:10039000BB29B018B7474B03E191B598670367AB2A

:1003A000DA18191A84AF4343B3129109FFAFBB7 136

:1003B000DAA4B991D7C363A798C010FCBB726D478C

:1003C000BB18D99B2167EB37AF10A9B947FF15348C

:1003D0008A8FF202E3670BB7F8B31391E7A5C7EF73

:1003E000DDBFF998E36E49FBFB3880ADAFF6D3FF74

:1003F000DA9BD8F8C15DEFFFA980F08A67D62B01A0

:10040000D818A900A23F9500CAD0FBA9FF8D810092

:10041000A9208D8300A23F9A20CF2FA50B650CF059

:100420000EA9098500A92A850220C52F4C372CA9C1

:100430008885078508850A0000A200982901F02B6E

:10044000B534290F0A0A0AE8C8C433D002098085E6

:100450003198053180000A52F2920D016A96F85F0

:100460001920F42FC006D0D34CC92CB53429F04A3A

:100470004C482CA52F2902D012A900851A851B856E

:100480001C851D851EA52F0902852F4E8200900D0B

:10049000A52F0908852FA96B85194CC32CA52F29D9

:1004A0008D007A96B85194CC32CA52F29F7852FD8

:1004B000A9198500A901851F984820452F68A8A91A

:1004C0005C851920F42F4C642CA52F29FEF05029AF

:1004D000F0F0170A90034CD22D10034CE02D0A0ABD

:1004E00010034CC82E90034C2D2DA52F2906C906AC

:1006B00018B52B6A952BE8842904F0F588D0EFA9A4

:1006C0000008506852F4C372CA9208D82004C892D62

:1006D000A9798D8000AD8200291E4AC909F008A9B8

:1006E00068D80004C2D2D20CF2FA202B50B950F2B

:1006F000CAD0F9A90D8504A900850F20842FA9016E

:100700008852F850E4C2D2DA203B512950ECAD0F95A

:10071000A203B50E9520CAD0F9A532850E4C152E30

:10072000A90185324C102FEAEAEAEAEAEAEAA3

:10073000EAEAEAEAEAEAEAEAEAEAA912850081

:10074000A9098517A9058516209S2F901DA517C5FF

:1007500015D008E632C616A9998517208A52FA20440

:10076000B527951FCAD0F94C482FA900C516D0014E

:1007700060A911850420842FA91F850420842FC619

:10078000164C482FA204A00418B1042A910488D062

:10079000F8CAD0F260EAA204F83B851FF52395270D

```
:1007A000CAD0F7D860A003F818B10079IC009100F6
:1007B00033D0F6EAEAEAEAEAEAEAEAEAEAEAEAEA09
:1007C000EAEAEAD860A004B100910283D0F960A9F1
:1007D0007D8D8000A203AD82004A290F950ACE804C
:1007E00000AD82000A0A0A29F0150A950ACE800097
:1007F000CAD0E360C619D0FC600000280002C002C91
```

We claim:

1. A method for measuring a variable as a function of time while simultaneously displaying a plural digit output in a display device capable of separate actuation of each digit display which comprises sequentially activating for display each digit display in an iterative sequence, generating an electric signal consisting of a series of pulses representative of said variable, activating a first control device to indicate when said variable is to be measured, activating a second control device to indicate when time is to be measured, checking in each iteration of activation of a said digit display whether said first control means is activated, when said first control means is found to be activated, checking to see whether there has been a pulse in said electric signal since the previous iteration, when a pulse is found to have occurred storing a count at a first location, then proceeding to the next iteration of display of a said digit display, the time in proceeding from one iteration of display of a said digit to the next being held to a fixed length regardless of whether said first control means is activated and whether a count is stored, continuing said iterations of display in said manner until said display is completed, thereafter checking whether said second control means is activated, when said second control means is found not to be activated repeating the above sequence, when said second control means is found to be activated, storing a count at a second location, repeating the display until both said first and second control means are found to be deactivated, thereafter dividing the stored count at said first location by the stored count at said second location, and displaying the quotient in said display.

* * * * *